United States Patent
Rollet (10) Patent No.: US 11,762,104 B2
(45) Date of Patent: Sep. 19, 2023

(54) METHOD AND DEVICE FOR LOCATING A VEHICLE

(71) Applicant: Continental Automotive GmbH, Hannover (DE)

(72) Inventor: Benjamin Rollet, Toulouse (FR)

(73) Assignee: Continental Automotive GmbH

( * ) Notice: Subject to any disclaimer, the term of this patent is extended or adjusted under 35 U.S.C. 154(b) by 284 days.

(21) Appl. No.: 17/158,250

(22) Filed: Jan. 26, 2021

(65) Prior Publication Data

US 2021/0318449 A1 Oct. 14, 2021

(30) Foreign Application Priority Data

Jan. 27, 2020 (FR) ...................................... 2000751

(51) Int. Cl.
*G01S 19/40* (2010.01)
(52) U.S. Cl.
CPC .................................. *G01S 19/40* (2013.01)
(58) Field of Classification Search
CPC ........ G01S 19/40; G01S 13/931; G01S 19/48; G01S 19/14; H04W 4/023; H04W 4/025; H04W 4/027; H04W 4/44; H04W 64/006
See application file for complete search history.

(56) References Cited

U.S. PATENT DOCUMENTS

| 9,776,916 | B2 | 10/2017 | Thostenson |
| 2017/0023659 | A1 | 1/2017 | Bruemmer et al. |
| 2020/0158886 | A1* | 5/2020 | Segal ..................... G01S 5/0054 |
| 2020/0387162 | A1* | 12/2020 | Kobayashi ............... G06N 3/08 |
| 2021/0035442 | A1* | 2/2021 | Baig ....................... H04W 4/40 |

(Continued)

FOREIGN PATENT DOCUMENTS

| EP | 2538237 A1 | 12/2012 |
| FR | 3085082 A1 | 2/2020 |

OTHER PUBLICATIONS

Delmas et al., "Reliable Localization Systems Including GNSS Bias Correction", 2010, Intech, pp. 119-132.

(Continued)

*Primary Examiner* — Geepy Pe
*Assistant Examiner* — Kimia Kohankhaki
(74) *Attorney, Agent, or Firm* — RatnerPrestia (57) ABSTRACT

A method and a device for locating a vehicle, able to estimate a first position of a vehicle from data that are generated by sensors of the vehicle and that are applied to a first particle filter, to store in memory, in a history, for a plurality of times, sensor data that led to the best estimations of a current position $t_i$, to receive at the time $t_n$ a corrected GNSS position of the vehicle at a time $t_0$, and to estimate using a second particle filter FP2 a corrected position of the vehicle at a time $t_i$ by applying the second particle filter FP2 to the received corrected GNSS position, to the data stored in memory in association with the time $t_i$ and to the dynamic characteristics of the vehicle that are associated with the time $t_{i-1}$.

8 Claims, 3 Drawing Sheets

(56) References Cited

U.S. PATENT DOCUMENTS

2021/0041248 A1\* 2/2021 Li .................... G06F 16/29

OTHER PUBLICATIONS

Liu et al., "Distributed Particle Filter For Target Tracking in Sensor Networks", Progress in Electromagnetics Research C, 2009, vol. 11, pp. 171-182.

Lucas-Sabola et al., "Demonstration of Cloud GNSS Signal Processing", Proceedings of the 29th International Technical Meeting of the Ion Satellite Division, Sep. 12-16, 2016, 10 pages.

Mutra et al. "Integrating Asynchronous Observations for Mobile Robot Position Tracking in Cooperative Environments", The 2009 IEEE/RSJ International Conference on Intelligent Robots and Systems. Oct. 11-15, 2015, 6 pages.

Orbitica Service de Correction Trimble RTX, 2020, downloaded at https://www.orbitica.com/gps/pro/corrections-trimble-rtx.htm, 2 pages.

Global Correction Services for GNSS, Hemisphere GNSS Whitepaper, 9 pages.

French Search Report and Written Opinion for French Application No. 2000751, dated Sep. 30, 2020, 8 pages.

\* cited by examiner

METHOD AND DEVICE FOR LOCATING A VEHICLE

CROSS REFERENCE TO RELATED APPLICATIONS

This application claims priority to French Patent Application No. 2000751, filed Jan. 27, 2020, the contents of such application being incorporated by reference herein.

FIELD OF THE INVENTION

The invention belongs to the field of vehicle location, and in particular relates to a method for correcting a current estimation of the position of a vehicle using an asynchronous correction datum.

BACKGROUND OF THE INVENTION

Techniques based on the study of the movements of the vehicle with respect to its environment, for example by means of cameras, radars or lidars, are known. It is for example a question of the technique called SLAM (Simultaneous Localization and Mapping). These techniques allow the position of a vehicle in its environment to be determined in a particularly precise manner. However, such systems have a tendency to accumulate small errors that lead to a drift in the positioning system, making the positioning information unreliable over a long distance.

In order to limit the drift of such a system, it is known to use positioning information from a GNSS (Global Navigation Satellite System) satellite. A GNSS is capable of delivering positioning information with a precision of about 10 to 15 meters in an absolute frame of reference, for example in a geodetic coordinate system such as WGS84. It will be noted that an improved precision may be obtained by using expensive systems such as D-GPS (Differential Global Positioning System) or RTK employing fixed stations.

It is thus possible to correct the drift of a locating system based on proprioceptive sensors of a vehicle. However, the precision of the positioning remains limited by the lack of precision of the GNSS positioning information.

In particular, this precision is insufficient when applications such as driving autonomous vehicles are considered.

Thus, there is a need for a solution allowing, at low cost and at any given time, a precise position of a moving vehicle to be obtained.

SUMMARY OF THE INVENTION

To this end, a method is provided for locating a vehicle, comprising the following steps:

For each time $t_i$ of a plurality of successive times $[t_0\text{-}t_n]$:
  Acquiring, from at least one sensor, positioning data and dynamic characteristics of the vehicle,
  Estimating the position of the vehicle at the time $t_i$ by applying a first particle filter FP1 to the data acquired at the time $t_i$ and to the dynamic characteristics of the vehicle that are associated with the time $t_{i-1}$,
  Storing in memory, in a history, a subset of the acquired data in association with the time $t_i$ of capture of said data, the subset of data comprising the data that contributed to the particles the weight of which is higher than a threshold, At the time $t_n$:
  Obtaining a corrected positioning datum corresponding to the time $T_0$,
  Estimating a corrected position of the vehicle at the time $t_0$ by applying a second particle filter FP2 to the subset of data stored in memory at the time $t_0$ and to the obtained corrected positioning datum, For each history datum stored in memory in the interval $[t_1\text{-}t_n]$:
  Estimating a corrected position of the vehicle at the time $t_i$ by applying the second particle filter FP2 to the subset of data stored in memory at the time $t_i$ and to the dynamic characteristics of the vehicle associated with the time $t_{i-1}$.

It is thus proposed to estimate the position of a vehicle from positioning data obtained from sensors of an ADAS (Advanced Driver-Assistance System) and from a GNSS receiver and from dynamic parameters of the vehicle. Such sensors are widely available in vehicles.

The position estimation is initially carried out, for a plurality of successive positions of the vehicle, by virtue of a first particle filter.

It will be recalled here that a particle filter allows a current position $P_c$ of a vehicle to be estimated from observations at the current time (observations generated by ADAS and GNSS sensors for example) and from a state known at the preceding time (dynamic parameters of the vehicle, for example VDY parameters, VDY standing for "Vehicle Dynamics"). The particle filter is configured to compute a plurality of particles representing hypotheses as to the positioning of the vehicle, and to select the hypothesis that is the most probable in light of the state of the vehicle at the preceding time.

The method is noteworthy in that the data that served to generate the most probable hypotheses are stored in memory, in a history, in association with the acquisition time to which they relate.

This history is used when, at a current time $T_c$, the vehicle receives corrected GNSS positioning information relating to a position of the vehicle at a preceding time $T_p$. This corrected GNSS position is more precise than the GNSS position obtained and used to estimate the position of the vehicle at the preceding time $T_p$: the GNSS position of the vehicle at the time $T_p$ is modified in the history, and the successive positions of the vehicle between the time $T_p$ and the current time $T_c$ are re-estimated by means of a second particle filter that is separate from the first particle filter. In this way, the corrected position of the vehicle at the time $T_p$ is propagated to the position of the vehicle at the current time $T_c$.

Given that only the relevant data were stored in memory, in the history, the hypotheses computed by the second filter are immediately more relevant. Furthermore, since the new estimations are based on a more precise initial GNSS position, the estimation of the current position is also more precise.

This new corrected current position may then be used to predict the next positions of the vehicle, while waiting for a new corrected GNSS position to become obtainable. In this way, a navigation system of a vehicle continuously has a precise position available to it.

According to one particular embodiment, the step of obtaining a corrected positioning datum corresponding to the time $T_0$ comprises the following steps:
  Obtaining raw positioning data corresponding to the position of a vehicle at the time $t_0$ from a satellite-positioning receiver,
  Transmitting to a processing server positioning data captured at the time $t_0$, the server being able to correct the GNSS data, Receiving from the server corrected positioning data associated with the time $t_0$.

Thus, the vehicle transmits "raw" GNSS data to a processing server and obtains in return a corrected GNSS position. The time taken to transfer the raw data, the time taken processing and the time taken to transfer the corrected position do not allow the datum to be used in real time because, at the time of reception of the corrected datum, it no longer corresponds to the current position of the vehicle. However, using this corrected past position, the method is able to re-estimate the successive positions of the vehicle up to the current time, and therefore to obtain an improved current position.

The use of a processing server to correct a GNSS position allows advantage to be taken of a computing power higher than that located on-board a vehicle.

According to one particular embodiment, the second particle filter comprises a number of particles lower than the first filter.

Since only the relevant data (i.e. the data that allowed valid hypotheses to be generated) was stored in memory, in the history, the amount of data to be processed by the second filter is smaller. Thus, it is possible to decrease the number of particles computed by the second filter so as to decrease the complexity of the computations, the amount of memory required and the power consumption, without affecting the quality of the estimations.

According to one particular embodiment, the subset of the data stored in memory at the time $t_i$ that is applied to the second particle filter comprises data associated with particles determined by the first particle filter for the time $t_{i+1}$ the weight of importance of which is higher than a threshold.

The weights of importance are a posteriori probabilities associated with the particles. Thus, only the (camera, radar, GNSS, etc.) signals corresponding to particles to which high weights have been assigned are stored in the history.

Such a measure allows the amount of data input into the second particle filter to be decreased, and thus the number of particles required for the second filter to produce correct estimations to be decreased.

In one particular embodiment, the second filter FP2 comprises at least one particle computed by the first filter FP1 for the time ti, the particle being such that its weight computed by the filter FP1 is higher than a threshold.

In this way, the second particle filter does not need to recompute all the particles: the particles computed and validated by the first filter, i.e. for example the particles computed for a given time the weight of which is higher than a threshold, are "imported" into the second filter during the computation of the particles for the same given time. Furthermore, the second filter FP2 requires fewer particles to run for a longer time (from the time to which the received corrected datum corresponds to the current time) because aberrant particles are filtered by the first filter FP1.

Such a measure allows the complexity of the processing operations to be further decreased by reusing best estimations of the first filter as hypotheses in the estimations of the second filter.

According to one particular embodiment, the method furthermore comprises a step of transmitting, to a server, a correction datum representative of a discrepancy between the positioning of the vehicle estimated by a sensor at a time ti and the position estimated by the second filter FP2 for the time ti.

Thus, for example, a vehicle may transmit the discrepancy observed between the position delivered by a GNSS receiver (or an ADAS camera, a radar, etc.) and the current position estimated by the second particle filter to a server. The server may thus establish a map of the corrections and transmit this map to other vehicles driving in a neighboring space-time. Thus, a vehicle may obtain, from the server, a datum allowing it to correct a position delivered by its GNSS receiver for example.

According to another aspect, the invention relates to a device for locating a vehicle comprising a plurality of sensors, a memory and a processor, the processor being configured by instructions stored in the memory to implement the following steps:

For each time $t_i$ of a plurality of successive times $[t_0\text{-}t_n]$:
Acquiring, from at least one sensor, positioning data and dynamic characteristics of the vehicle,
Estimating the position of the vehicle at the time $t_i$ by applying a first particle filter FP1 to the data acquired at the time $t_i$ and to the dynamic characteristics of the vehicle that are associated with the time $t_{i-1}$,
Storing in memory, in a history, a subset of the acquired data in association with the time $t_i$ of capture of said data, the subset of data comprising the data that contributed to the particles the weight of which is higher than a threshold,
At the time $t_n$:
Obtaining a corrected positioning datum corresponding to the time $T_0$,
Estimating a corrected position of the vehicle at the time $t_0$ by applying a second particle filter FP2 to the subset of data stored in memory at the time $t_0$ and to the obtained corrected positioning datum,
For each history datum stored in memory in the interval $[t_1\text{-}t_n]$:
Estimating a corrected position of the vehicle at the time $t_i$ by applying the second particle filter FP2 to the subset of data stored in memory at the time $t_i$ and to the dynamic characteristics of the vehicle associated with the time $t_{i-1}$.

According to yet another aspect, the invention relates to a vehicle comprising a locating device such as described above.

Lastly, the invention relates to a processor-readable data medium on which is stored a computer program comprising instructions for executing the steps of a locating method such as described above.

The data medium may be a non-transient data medium such as a hard disk, a flash memory or an optical disk for example.

The data medium may be any entity or device capable of storing instructions. For example, the medium may comprise a storing means, such as a ROM, RAM, PROM, EPROM, a CD ROM or even a magnetic storing means, a hard disk for example.

Furthermore, the data medium may be a transmissible medium such as an electrical or optical signal, which may be transmitted via an electrical or optical cable, via radio or via other means.

Alternatively, the data medium may be an integrated circuit into which the program is incorporated, the circuit being able to execute or to be used in the execution of the method in question.

The various aforementioned embodiments or implementation features may be added independently or in combination with one another, to the steps of the locating method.

The devices, vehicles and data media have at least advantages analogous to those conferred by the method to which they relate.

BRIEF DESCRIPTION OF THE DRAWINGS

Other features, details and advantages of the invention will become apparent on reading the following detailed description and on analyzing the appended drawings, in which.

DETAILED DESCRIPTION OF ONE EMBODIMENT

Figure 1:
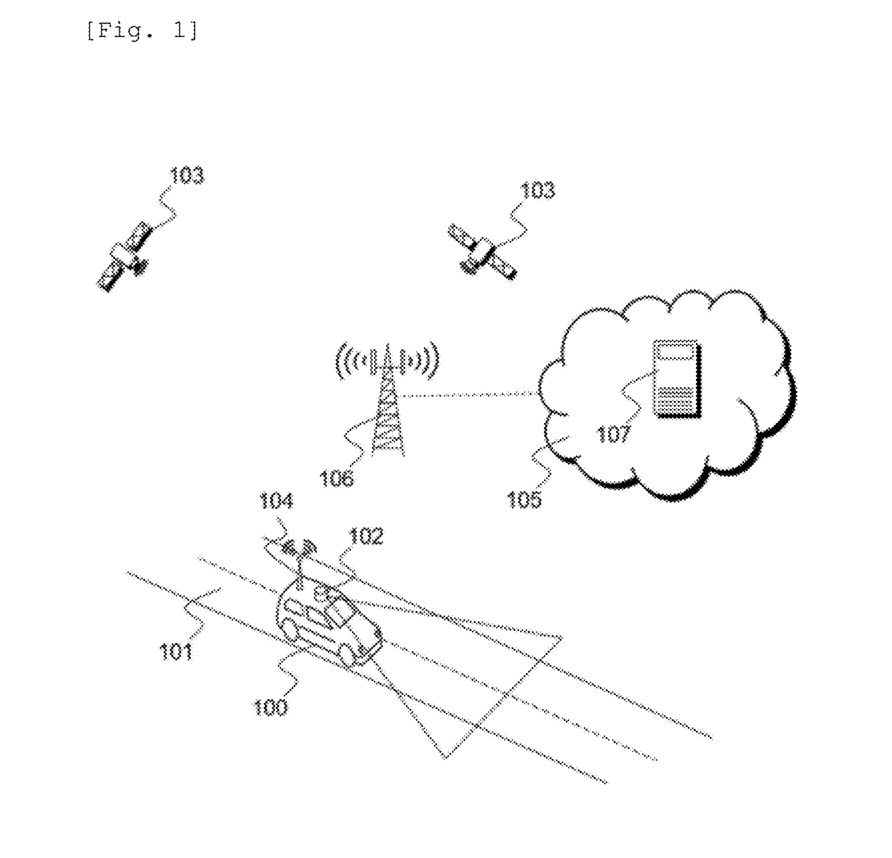
FIG. 1 shows an environment able to implement the locating method according to one particular embodiment.

FIG. 1 shows a vehicle 100 driving on a road network 101. The vehicle is equipped with an ADAS comprising, for example, a radar 102. Of course, the ADAS may comprise other sensors, such as one or more cameras, lidars, etc. The ADAS is configured to analyze the signals acquired by the sensors and to determine a trajectory of the vehicle with respect to an initial position. Thus, the radar 102 of the vehicle 100 allows a relative positioning of the vehicle with respect to its environment to be determined.

The vehicle 100 furthermore comprises a GNSS receiver that is able to receive raw signals from satellites 103 and to determine, from an analysis of these signals, an absolute position of the vehicle. For example, the GNSS receiver allows the vehicle to determine its latitude and its longitude in a geodetic frame of reference with a margin of error of about ten meters.

The vehicle 100 also comprises communication means, for example a 3G, 4G or 5G cellular network interface 104, allowing it to access a communication network 105 via a cellular access network 106. In particular, these communication means allow the vehicle to exchange messages with a processing server 107 of the network 105.

The vehicle 100 lastly comprises a memory and a computer, for example an ECU (Electronic Control Unit), able to obtain operating parameters of the vehicle via a communication bus, for example a CAN (Controller Area Network) bus, to which are connected various sensors allowing the state of the vehicle, such as for example the angular velocity of each wheel, the orientation of the front wheels, or even lateral and longitudinal accelerations, to be determined.

The computer of the vehicle 100 is configured, by computer-program instructions stored in the memory, to estimate, at regular intervals, for example every 60 milliseconds, a position of the vehicle.

The position of the vehicle is estimated by means of a first particle filter FP1, to which the location data obtained by the GNSS receiver, and the data obtained via the sensors of the vehicle (ADAS sensors, CAN signals), are delivered as input.

It will be recalled that, given observations, a particle filter seeks to represent a distribution of probabilities conditional on a hidden state. Such a filter employs a system of particles that are characterized by positions and weights. Thus, to estimate the position of the vehicle at a time T, a particle filter computes particles representing hypotheses as to the position of the vehicle. These hypotheses are generated from the state of the vehicle at the time T−1.

Thus, a particle corresponds to one possible change in the position of the vehicle at a time T given its state at a preceding time T−1. When observations are available for the time T, for example observations obtained from sensors of the ADAS of the vehicle or a GNSS location, the compatibility of each particle with this observation is evaluated by virtue of a likelihood function: each particle is then assigned a weight proportional to the computed value. The particles are then eliminated or multiplied depending on their weight, in a second iteration.

For a particular sensor, the likelihood function is for example a Gaussian distribution applied to the errors, i.e. the discrepancy, between data acquired by the sensor at a time T and synthesized data estimated for a time T from a state at the time T−1.

Figure 2:
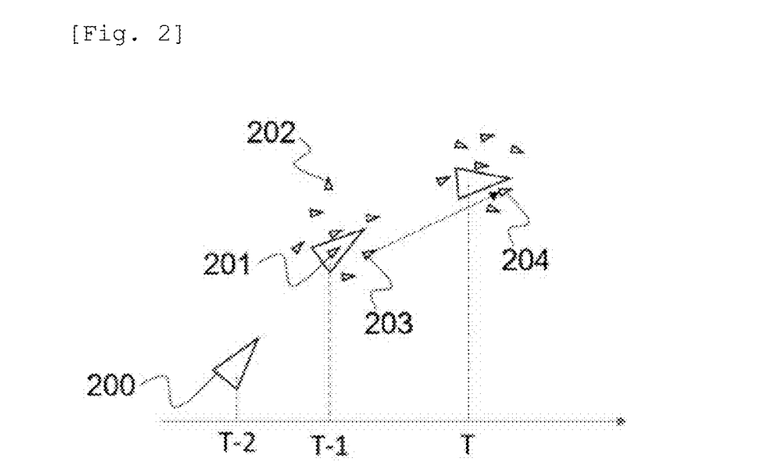
FIG. 2 illustrates positions of a vehicle estimated by a first particle filter.

FIG. 2 shows the state of the vehicle 100 at times T−2, T−1 and T. At the time T−1, the particle filter FP1 computes a plurality of particles, 1000 particles for example, from the state 200 of the vehicle at the time T−2. The state of the vehicle 100 at a given time is described by a state vector Ve for example containing one or more elements among the last estimated position of the vehicle, its orientation, the angular velocity of each wheel, the orientation of the front wheels, or even lateral and longitudinal accelerations.

For each of the computed particles, the particle filter FP1 computes a weight. The weight of a particle at the time T−1 corresponds to the probability that the vehicle is located in the corresponding position given its state at the preceding time T−2. Thus, on the basis of the data captured by the ADAS and/or GNSS sensors of the vehicle, weights are associated with each of the particles.

In the example of FIG. 2, considering the particle 202, a very low weight is attributed to the particle 202 for example because it does not correspond to the GNSS and/or ADAS observations. In contrast, a high weight is computed for the particle 201 because its position agrees with the GNSS and ADAS observations. The particle filter thus estimates that the most probable location of the vehicle is represented by the particle 201. The particle 202 for its part is eliminated. The particle 201, with which is associated the state of the vehicle at the time T−1 (which is obtained via the CAN sensors), will serve as basis for the estimation of the position of the vehicle at the time T using a similar method.

When a particle is eliminated, like the particle 202, a new particle is created during the estimation of the position at the following time. When a particle is validated at a time T−1, like the particle 203, the particle filter applies thereto a transformation to determine its position 204 at the time T. The applied transformation is determined from the state vector Ve of the vehicle at the time T−1.

The estimation of the current position may also comprise one or more additional iterations allowing the estimation to be refined. To do this, in a second iteration, the particles the weight of which is lowest are eliminated and a new set of particles is computed about the particle the weight of which is highest. New weights are then computed for the particles of this new set, the particle of highest weight being selected as estimation of the position of the vehicle.

Figure 3:
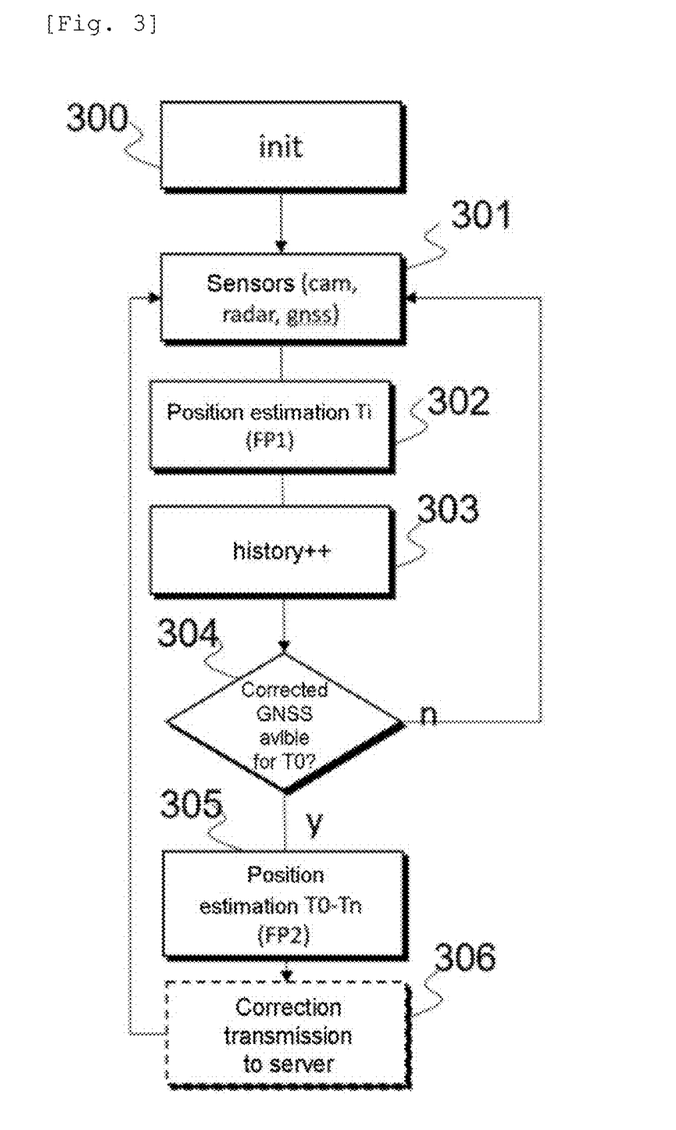
FIG. 3 is a flowchart illustrating the main steps of a locating method according to one particular embodiment of the invention.

The locating method will now be described with reference to FIG. 3.

In a first step 300, an initial position of the vehicle in a geodetic frame of reference is determined from a location datum obtained, for example, via a GNSS receiver of the vehicle. This initial position allows a first particle filter FP1 to be initialized by defining its position at a time T−2.

In the initializing step, the vehicle furthermore obtains operating parameters of the vehicle at the time T−2 from sensors connected to a CAN bus. These operating parameters allow a state vector Ve1 of the vehicle, which for example comprises the orientation and the velocity of the drive wheels at the time T−2, to be established.

In step 301, the vehicle obtains, at a time T−1, positioning data from various sensors. In particular, the vehicle obtains a new GNSS position from a suitable receiver, and positioning data relating to the environment from proprioceptive sensors, such as sensors of an ADAS. The vehicle furthermore establishes a new state vector Ve2, which for example comprises the orientation and the velocity of the drive wheels at the time T−1.

In a step 302, a position of the vehicle at the time T−1 is estimated by the first particle filter FP1. To do this, a set of particles are computed by the particle filter FP1 for the time T−1. These particles are computed from the state vector Ve1 defining the state of the vehicle at the time T−2. These particles represent various hypotheses as to the position of the vehicle given the state vector Ve1.

A weight is then attributed to each of the particles depending on their likelihood with regard to the GNSS and ADAS positioning data obtained in step 301.

At the end of step 302, the estimation of the position of the vehicle corresponds to the position of the particle of highest weight.

In a step 303, the vehicle stores in memory, in a history, the data generated by sensors that contributed to the computation of the particles the weight of which is higher than a threshold.

To do this, a discrepancy, or an error, between the synthesized data of the particle, i.e. the characteristics of the particle at the time T that were estimated from a state of the vehicle at the time T−1, and the data acquired at the time T by each sensor, is computed. The lower the error, the better the contribution of the corresponding sensor to the evaluation of the weight.

The error is for example a metric error between the position of an object, which position is computed from data generated by sensors (for example the position of a panel estimated from an image captured by a camera at a time T) and a simulation of the object in the synthesized data (for example the position of the same panel estimated in step T−1) assuming a new state, for example a new position, of the vehicle at the time T.

The weight of a particle is determined from the error computed for each sensor. The weight thus allows the relevant states of the vehicle to be selected. The error for its part allows the contribution of the sensors to the evaluation of a weight to be defined.

Thus, when the error computed at a time T for a sensor and a particle is low, the data of the sensor are stored in memory in association with a timestamp corresponding to the time of capture. For example, if the analysis of an image generated by an ADAS camera at the time T−1 indicates that the particle 202 in FIG. 2 is likely, but this particle has been assigned a low weight because it is too different from the GNSS observation, the image of the ADAS camera is not stored in memory because it has manifestly resulted in a positioning error (for example because the camera is occulted at this time). In contrast, if for example the analysis of a signal generated for example by a radar of the vehicle has allowed the particle 201 the weight of which is highest to be estimated, the radar signal is stored in memory in association with a timestamp corresponding to the time of capture. In this way, only the data relevant to the position of the vehicle are stored in memory in the history.

The history may be stored in memory in a moving time window, for example in a window of 5 seconds. This duration may be adjusted depending on various constraints such as the time required to obtain a corrected GNSS position, a network latency, the performance of the estimations carried out by the first filter FP1, and the memory available to store the history. Thus, when new data are stored in memory, the oldest data are deleted from the history.

Steps 301, 302 and 303 may be repeated for a plurality of successive times in order to estimate various successive positions of the vehicle.

In a step 304, the vehicle obtains, at a time T, a corrected GNSS location corresponding to the location of the vehicle at a preceding time, for example at the time T−1. The corrected location datum is for example received in a message comprising at least the latitude and the longitude of the vehicle at the time T−1, and a timestamp datum indicating the time of capture of the location datum. Thus, the vehicle has available to it a new GNSS datum regarding the time T−1, this new datum being more precise than the datum obtained via the GNSS receiver of the vehicle at the time T−1.

The vehicle takes into account the corrected GNSS position relating to the time T−1 received at the time T to estimate its current position at the time T more precisely.

To do this, the vehicle implements a second particle filter FP2. In one particular embodiment, the filter FP2 comprises a number of particles lower than the number of particles of the first filter FP1. For example, the second filter comprises 10 times fewer particles than the first filter FP1, i.e. 100 particles.

In a step 305, the vehicle uses the timestamp datum associated with the corrected positioning datum to search, in the history, for signals that were stored in memory at the time at which the vehicle occupied the corrected position, i.e. in this example at the time T−1. It will be recalled that only the signals associated with validated particles, i.e. particles to which a weight higher than a threshold has been assigned, have been stored in memory in the history. Thus, the amount of signals obtained from the history for the time T−1 is lower than the amount of data captured in step 301 for the time T−1. When a GNSS positioning datum is present in the history for the time T−1, it is replaced by the corrected GNSS positioning datum corresponding to this time. These history data, associated with the corrected GNSS positioning datum, allow the position of the vehicle at the time T−1 to be re-estimated more precisely and the second particle filter FP2 to be initialized.

To do this, the particle filter FP2 determines a set of particles that are representative of possible positions of the vehicle at the time T−1, from the state vector Ve of the vehicle at the time T−2 stored in memory in the history.

According to one particular embodiment, the set of particles that is determined by the second filter FP2 for the time T−1 comprises at least one particle computed by the first filter FP1 for the state T−1, preferably a particle the weight of which attributed by the first filter FP1 is higher than an adaptive threshold, i.e. one that is determined dynamically. The adaptive threshold is determined so as to select, for the second filter FP2, a subset of the particles of the filter FP1. For example, the threshold is determined so that 10% of the data representative of the particles of the first filter FP1 are reused by the second filter FP2. To do this, the step 303 of storing in memory, in the history, furthermore comprises, for each position estimated by the first filter FP1, storing in memory at least one characteristic representative of a particle the weight of which is higher than the threshold. This particle may thus be used directly by the second particle filter FP2, without it being necessary to recompute it, to re-estimate the successive positions of the vehicle. Processing times are thus optimized.

In one particular embodiment, the data transmitted from the first filter FP1 to the second filter FP2 comprise one or more of the following data:
- at least one particle identifier, the identifier allowing a particle to be tracked over a plurality of iterations of the first filter FP1.
- a state vector associated with the particles the weight of which is higher than a threshold, the threshold being determined dynamically. An adaptive threshold makes it possible to guarantee that at least one datum is transmitted from the first filter FP1 to the second filter FP2. Furthermore, it is desirable to obtain a spread distribution of the particles in the second filter FP2 in order to limit a drift. To do this, the distribution of the weights must not be uniform.
- at least one particle weight of the first filter FP1, allowing an initialization of the weights of the particles of the second filter FP2 to be initialized. In this way, it is not necessary to initialize the second filter with arbitrarily selected default values.
- the sensor-data history, in which sensor data relevant to the first filter FP1 have been stored.

The vehicle then attributes weights to the particles determined for the time T−1, on the basis of the data stored in memory, in the history, at the time T−1, and especially on the basis of the corrected GNSS position obtained in step 304.

Figure 4:
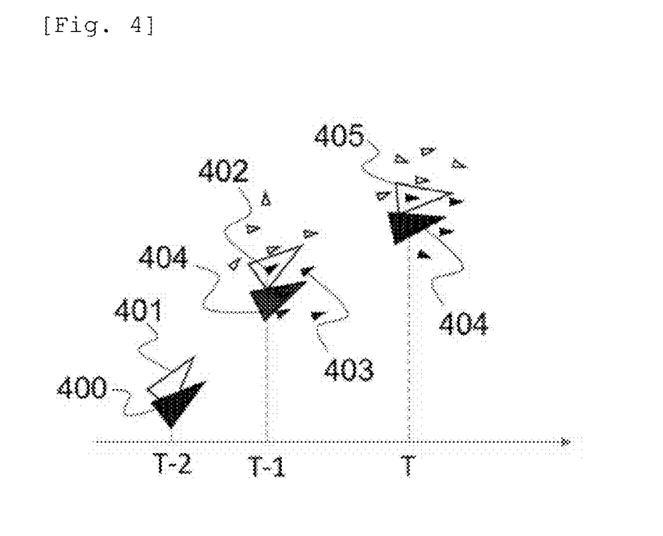
FIG. 4 shows corrected positions of a vehicle estimated by a second particle filter.

FIG. 4 illustrates a corrected GNSS position 400 of the vehicle at the time T−2 allowing an erroneous GNSS position 401 obtained via a GNSS receiver to be corrected. It will be noted that, at the time T−1, a new set of particles have been determined (in black in the figure). This new set in particular comprises the particles 402 and 403 computed by the first filter FP1, and to which the filter FP1 attributed a weight higher than a preset threshold. New particles are furthermore computed on the basis of the state vector Ve stored in memory at the time T−2 and of the corrected GNSS position 400.

The set of particles thus determined for the state T−1 is then weighted using positioning data stored in memory, in the history, at the time T−1 in step 303, the particles of low weight being eliminated, and the particles of high weight being multiplied and validated in a conventional operation of the particle filter described above, in order to obtain an estimation 404 of the position of the vehicle at the time T−1.

From this new corrected estimation, the vehicle successively estimates, in the same way, the position of the vehicle at each intermediate position between the corrected position and the current position for which data have been stored in memory, in the history, by applying the second particle filter FP2. By thus propagating the corrected GNSS positioning datum, the vehicle is able to obtain an estimation 404 of the position of the vehicle at the current time T that is more precise than the first estimation 405. Furthermore, the low number of signals (with respect to the number of signals captured and fed to the first filter) to which the second filter FP2 is applied allows the number of particles required to obtain a satisfactory estimation to be limited.

According to one particular embodiment, the vehicle 100 transmits raw satellite positioning data to a correction server 107 of the communication network 105. To do this, the satellite-positioning receiver of the vehicle is configured to measure a plurality of distances, referred to as raw satellite-positioning data, between the satellite-positioning receiver and a plurality of satellites visible to the satellite-positioning receiver. In one example, the satellite-positioning receiver receives signals from a GNSS satellite-positioning system, such as the American system GPS, the Russian system GLONASS and/or the European system GALILEO.

The raw satellite-positioning data comprise raw data that may be obtained using known methods such as phase measurement or code measurement, and indicators of the quality of these measurements.

The raw data are transmitted by means of a cellular communication interface of the vehicle, for example a 3G, 4G or 5G interface, or even a Wi-Fi® or WiMAX® interface. The vehicle transmits the raw GNSS data regularly, for example every 5 seconds, or indeed as the need arises. The transmission interval for example depends on the infrastructure, on the network transmission time and server processing time, or on the need to locate the vehicle. For example, the raw GNSS data are transmitted in a message in the JSON, XML or CSV format to the server 107.

On reception of the raw GNSS data, the correction server 107 performs a computation of the position of the vehicle from the transmitted raw data and from complementary data, for example orbital data such as ephemerides data and clock correction data, and measurements relating to the conditions of atmospheric propagation of the satellite signals, in the ionosphere and troposphere for example.

When a corrected location corresponding to the position of the vehicle 100 at a time T−2 has been determined by the correction server 107, the corrected location is transmitted to the vehicle at a time T.

According to one particular embodiment of the invention, when the vehicle 100 obtains, in step 305, a corrected estimation of its current position at the time T, a value representative of a discrepancy between the estimated position and the position determined by a sensor is computed in step 306. For example, the vehicle computes a difference between the corrected estimation of the position of the vehicle at the time T and the GNSS coordinates obtained at the time T via a GNSS receiver of the vehicle. This discrepancy value allows a correction to be applied to the data of the GNSS receiver to obtain a reliable location at the current site to be determined.

The computed correction value is transmitted to a mapping server in a message furthermore comprising the current date and the corrected estimated position of the vehicle. The server stores the correction in memory, in a geospatial database, for example in the form of a digital map. This map may then be downloaded by other vehicles to correct a location datum delivered by a sensor of the same type, in a given region and in a given time window.

Since positioning errors are often due to environmental conditions, the correction value may be applied to other receivers in the same geographical zone and in a given time window. For example, a location error of a GPS receiver may be due to particular ionospheric conditions. These particular conditions produce the same error in one geographic zone and at one particular date. Therefore, a correction value determined by one vehicle using the method described above may be used to correct location data of other vehicles.

Figure 5:
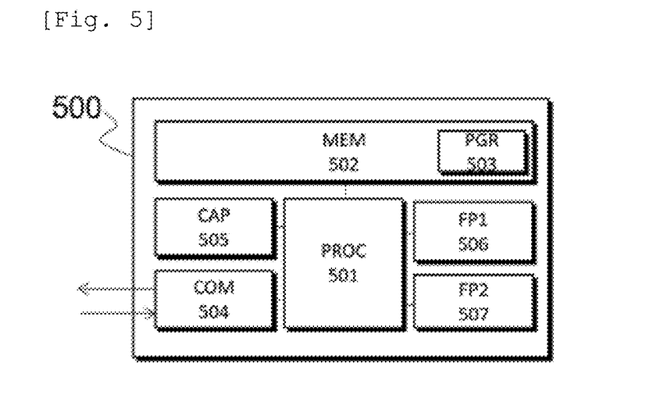
FIG. 5 shows the architecture of a locating device able to implement the locating method according to one particular embodiment.

FIG. 5 shows the architecture of a device able to implement the locating method according to one particular embodiment of the invention.

The device 500 comprises a storage space 502, for example a memory MEM, and a processing unit 501 that is for example equipped with a processor PROC. The processing unit may be controlled by a program 503, for example a computer program PGR, implementing the locating method according to steps 300 to 305 described above.

On initialization, the instructions of the computer program 503 are for example loaded into a RAM (Random Access Memory) before being executed by the processor of the processing unit 501. The processor of the processing unit 501 implements the steps of the locating method according to the instructions of the computer program 503.

To do this, apart from the memory and the processor, the device 500 comprises one or more sensors 505, for example a GNSS receiver, sensors of an ADAS, such as a camera or a radar, and one or more sensors of the operation of a vehicle into which the device is integrated, such as sensors of the velocity of rotation and orientation of the wheels. The sensors may be integrated into the device or connected thereto by a communication bus of the vehicle, a CAN bus for example. They especially allow a first geographic position and a dynamic state of the vehicle at a time $t_{i-1}$ and a representation of the environment of the vehicle in a state $t_i$, to be obtained.

The device 500 comprises a first particle filter 506 (FP1), which is able to estimate the position of the vehicle at the time $t_i$ from data generated by the sensors 505, in particular for the data acquired at the time $t_i$ and for the dynamic characteristics of the vehicle that are associated with the time $t_{i-1}$. The first particle filter FP1 is for example implemented via computer-program instructions stored in the memory 502 and able to be executed by the processor 501.

The memory 502 of the device 500 is furthermore able to store a subset of the data acquired by the sensors 505 in association with the time $t_i$ of capture of said data, the subset of data comprising the data that contributed to the particles computed by the first filter 506 (FP1) the weight of which is higher than a threshold.

The device 500 also comprises communication means 504, for example a cellular network interface allowing it to connect to a cellular access network, for example a Wi-Fi®, WiMAX®, 3G, 4G or 5G access network, with a view to exchanging messages with other devices. The communication means are in particular able to transmit a GNSS location datum obtained by a GNSS receiver corresponding to the position of the vehicle at the time $t_i$ to a processing server and to receive, at a time $t_{i+n}$, a correction of the transmitted GNSS location datum.

The device 500 also comprises a second particle filter 507 (FP2). The second particle filter is for example implemented via computer-program instructions stored in the memory 502 of the device and able to be executed by the processor 501 in order to estimate a corrected position of the vehicle at a time $t_0$ from the subset of data stored in the memory 502 in association with the time $t_0$ and for the corrected positioning datum obtained via the communication means 504. The instructions are furthermore configured to estimate, for each history datum stored in memory in the interval $[t_1 - t_n]$, a corrected position of the vehicle at a time $t_i$ from the subset of data associated with the time $t_i$ and from dynamic characteristics of the vehicle that are associated with the time $t_{i-1}$ and stored in the memory 502.

According to one particular embodiment, the device 500 is integrated into a road vehicle, for example an automobile, a truck or even a motorcycle.

The invention claimed is:

1. A method for locating a vehicle, comprising:
For each time $t_i$ of a plurality of successive times $[t_0 - t_n]$:
Acquiring, from at least one sensor, positioning data and dynamic characteristics of the vehicle,
Estimating the position of the vehicle at a time $t_i$ by applying a first particle filter FP1 to the positioning data acquired at the time $t_i$ and to the dynamic characteristics of the vehicle that are associated with a time $t_{i-1}$,
Based on the acquired positioning data, computing a plurality of particles and assigning to each particle having a weight representing a probable position of the vehicle,
Storing in memory, in a history, a subset of the acquired positioning data in association with the time $t_i$ of capture of said positioning data, the subset of the acquired positioning data including data that contributed to particles with weight higher than a threshold,
At a time $t_n$:
Obtaining a corrected positioning datum corresponding to the position of the vehicle at a time $t_0$, the corrected positioning datum being more precise than the positioning datum acquired from the at least one sensor of the vehicle at the time $t_0$,
Estimating a corrected position of the vehicle at the time $t_0$ by applying a second particle filter FP2 to the subset of the acquired positioning data stored in memory in association with the time $t_0$ and to the obtained corrected positioning datum,
For each history datum stored in memory in an interval $[t_1 - t_n]$:
Estimating a corrected position of the vehicle at the time $t_i$ by applying the second particle filter FP2 to the subset of the acquired positioning data stored in memory in association with the time $t_i$ and to the dynamic characteristics of the vehicle associated with the time $t_{i-1}$, and
Predicting a next position of the vehicle based on the estimated corrected position of the vehicle.

2. The method as claimed in claim 1, wherein the step of obtaining a corrected positioning datum corresponding to the time $t_0$ comprises:
Obtaining raw positioning data corresponding to the position of a vehicle at the time $t_0$ from a satellite-positioning receiver,
Transmitting to a processing server positioning data captured at the time $t_0$, the server being able to correct the GNSS data,
Receiving from the server corrected positioning data associated with the time $t_0$.

3. The method as claimed in claim 1, wherein the second particle filter FP2 comprises a number of particles lower than the first particle filter FP1.

4. The method as claimed in claim 1, wherein the subset of the data stored in memory at the time $t_i$ that is applied to the second particle filter FP2 comprises data associated with particles determined by the first particle filter FP1 for the time $t_i$ the weight of importance of which is higher than a threshold.

5. The method as claimed in claim 1, wherein the second filter FP2 comprises at least one particle computed by the first filter FP1, the particle being such that its weight computed by the filter FP1 is higher than a threshold.

6. The method as claimed in claim 1, such that it furthermore comprises transmitting, to a server, a correction datum representative of a discrepancy between the positioning of the vehicle estimated by the at least one sensor at the time $t_i$ and the position estimated by the second filter FP2 for the time $t_i$.

7. A device for locating a vehicle comprising a plurality of sensors, a memory and a processor, the processor being configured by instructions stored in the memory to implement the following steps:

For each time $t_i$ of a plurality of successive times $[t_0\text{-}t_n]$:
  Acquiring, from at least one sensor from the plurality of sensors, positioning data and dynamic characteristics of the vehicle,
  Estimating the position of the vehicle at a time $t_i$ by applying a first particle filter FP1 to the positioning data acquired at the time $t_i$ and to the dynamic characteristics of the vehicle that are associated with a time $t_{i-1}$,
  Based on the acquired positioning data, computing a plurality of particles and assigning to each particle having a weight representing a probable position of the vehicle,
  Storing in memory, in a history, a subset of the acquired positioning data in association with the time $t_i$ of capture of said positioning data, the subset of the acquired positioning data including data that contributed to the particles with weight higher than a threshold, At a time $t_n$:
  Obtaining a corrected positioning datum corresponding to the position of the vehicle at a time $t_0$, the corrected positioning datum being more precise than the positioning datum acquired from the at least one sensor of the vehicle at the time $t_0$,
  Estimating a corrected position of the vehicle at the time $t_0$ by applying a second particle filter FP2 to the subset of the acquired positioning data stored in memory at the time $t_0$ and to the obtained corrected positioning datum,
  For each history datum stored in memory in an interval $[t_1\text{-}t_n]$:
    Estimating a corrected position of the vehicle at the time $t_i$ by applying the second particle filter FP2 to the subset of the acquired positioning data stored in memory at the time $t_i$ and to the dynamic characteristics of the vehicle associated with the time $t_{i-1}$, and
  Predicting a next position of the vehicle based on the estimated corrected position of the vehicle.

8. A vehicle comprising a device for locating the vehicle, the device comprising a plurality of sensors, a memory and a processor, the processor being configured by instructions stored in the memory to implement the following steps:

For each time $t_i$ of a plurality of successive times $[t_0\text{-}t_n]$:
  Acquiring, from at least one sensor from the plurality of sensors, positioning data and dynamic characteristics of the vehicle,
  Estimating the position of the vehicle at a time $t_i$ by applying a first particle filter FP1 to the positioning data acquired at the time $t_i$ and to the dynamic characteristics of the vehicle that are associated with a time $t_{i-1}$,
  Based on the acquired positioning data, computing a plurality of particles and assigning to each particle having a weight representing a probable position of the vehicle,
  Storing in memory, in a history, a subset of the acquired positioning data in association with the time $t_i$ of capture of said positioning data, the subset of the acquired positioning data including data that contributed to the particles with weight higher than a threshold, At a time $t_n$:
  Obtaining a corrected positioning datum corresponding to the position of the vehicle at a time $t_0$, the corrected positioning datum being more precise than the positioning datum acquired from the at least one sensor of the vehicle at the time $t_0$,
  Estimating a corrected position of the vehicle at the time $t_0$ by applying a second particle filter FP2 to the subset of the acquired positioning data stored in memory at the time $t_0$ and to the obtained corrected positioning datum,
  For each history datum stored in memory in an interval $[t_1\text{-}t_n]$:
    Estimating a corrected position of the vehicle at the time $t_i$ by applying the second particle filter FP2 to the subset of the acquired positioning data stored in memory at the time $t_i$ and to the dynamic characteristics of the vehicle associated with the time $t_{i-1}$, and
  Predicting a next position of the vehicle based on the estimated corrected position of the vehicle.

* * * * *